(No Model.)  6 Sheets—Sheet 2.

T. J. HUME.
CASH REGISTER AND INDICATOR.

No. 477,548.  Patented June 21, 1892.

(No Model.)  6 Sheets—Sheet 3.

T. J. HUME.
CASH REGISTER AND INDICATOR.

No. 477,548.  Patented June 21, 1892.

WITNESSES:  INVENTOR
  Thomas J. Hume
  BY
  Arthur W. Harrison
  ATTORNEY.

(No Model.) 6 Sheets—Sheet 4.
T. J. HUME.
CASH REGISTER AND INDICATOR.
No. 477,548. Patented June 21, 1892.
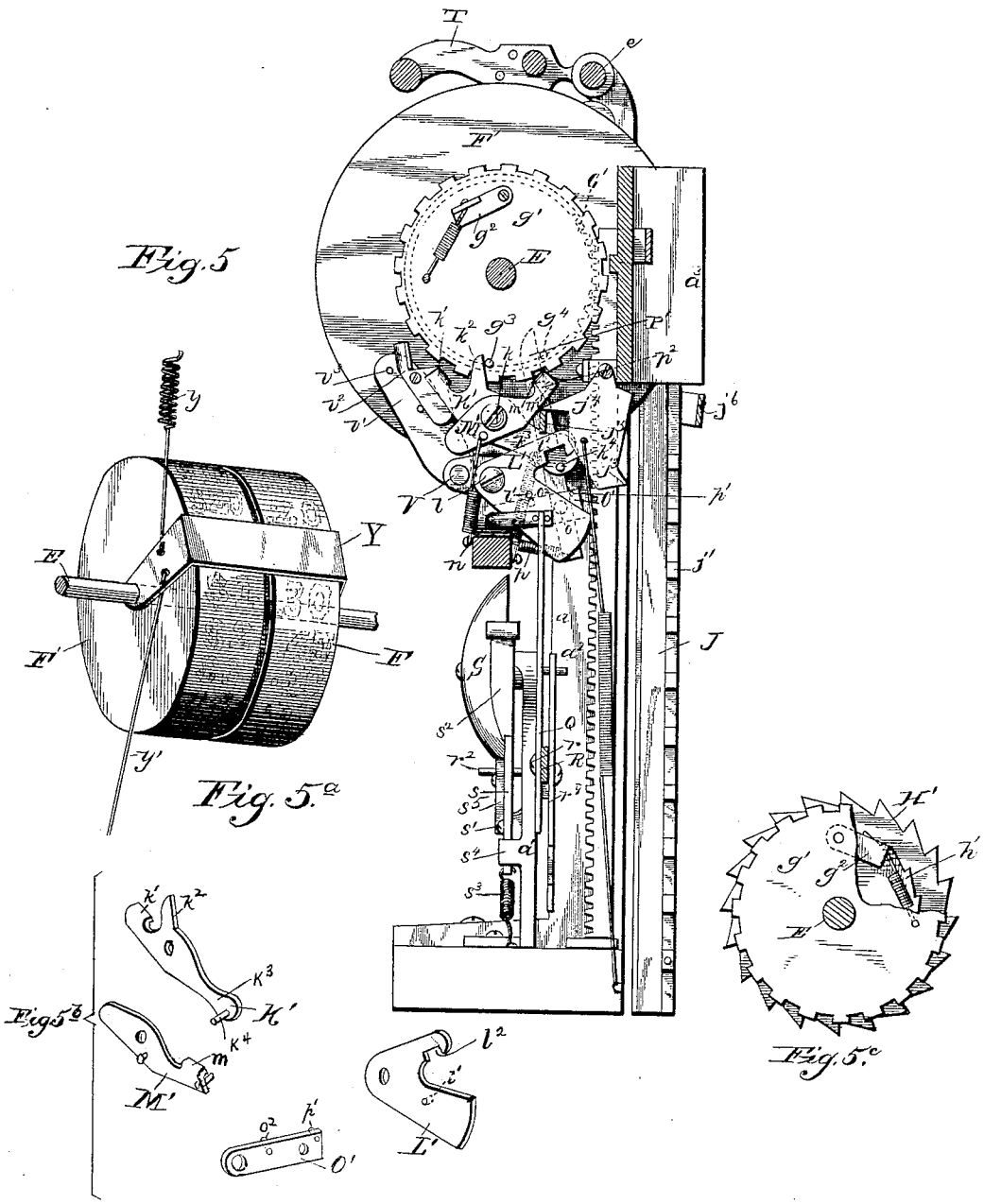
WITNESSES:
A. S. Cushman.
C. M. Sweeney.
INVENTOR
Thomas J. Hume
BY
Arthur W. Harrison
ATTORNEY.

(No Model.)
6 Sheets—Sheet 5.
T. J. HUME.
CASH REGISTER AND INDICATOR.
No. 477,548. Patented June 21, 1892.
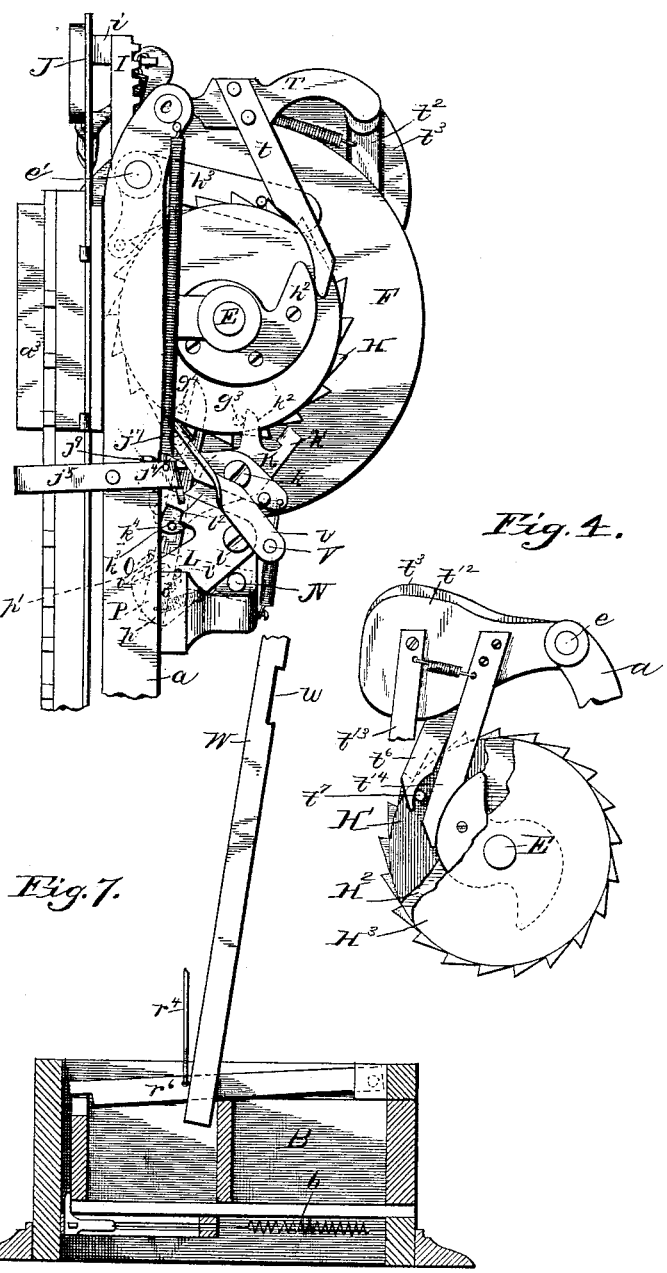
WITNESSES:
O. S. Cushman
C. M. Sweeney
INVENTOR
Thomas J. Hume
BY
Arthur W. Harrison
ATTORNEY.

(No Model.)
6 Sheets—Sheet 6.

T. J. HUME.
CASH REGISTER AND INDICATOR.

No. 477,548.     Patented June 21, 1892.

WITNESSES:
O. H. Cushman.
C. M. Sweeney

INVENTOR
Thomas J. Hume
BY
Arthur W. Harrison.
ATTORNEY.

UNITED STATES PATENT OFFICE.

THOMAS J. HUME, OF ATCHISON, KANSAS, ASSIGNOR OF ONE-HALF TO WILLIAM F. GUTHRIE, OF SAME PLACE.

CASH REGISTER AND INDICATOR.

SPECIFICATION forming part of Letters Patent No. 477,548, dated June 21, 1892.

Application filed September 23, 1891. Serial No. 406,575. (No model.)

*To all whom it may concern:*

Be it known that I, THOMAS J. HUME, of Atchison, in the county of Atchison and State of Kansas, have invented new and useful Improvements in Cash Indicators and Registers, (for which I have made application for a patent in Canada on the 28th day of September, 1891, said application being numbered 58,023;) and I do hereby declare the following to be a full, clear, and exact description of said invention, reference being had to the accompanying drawings, and to the letters of reference marked thereon, which form a part of this specification.

The object of my invention is to provide an improved cash indicating and registering apparatus which shall be cheap in construction, easy and accurate in operation, capable of indicating in a single sum at a common point the various amounts within the capacity of the machine, and totalizing the registrations; and to this end my invention consists in the apparatus and in the construction, arrangement, and combination of the parts and the elements thereof, as hereinafter described and claimed.

Figure 1:
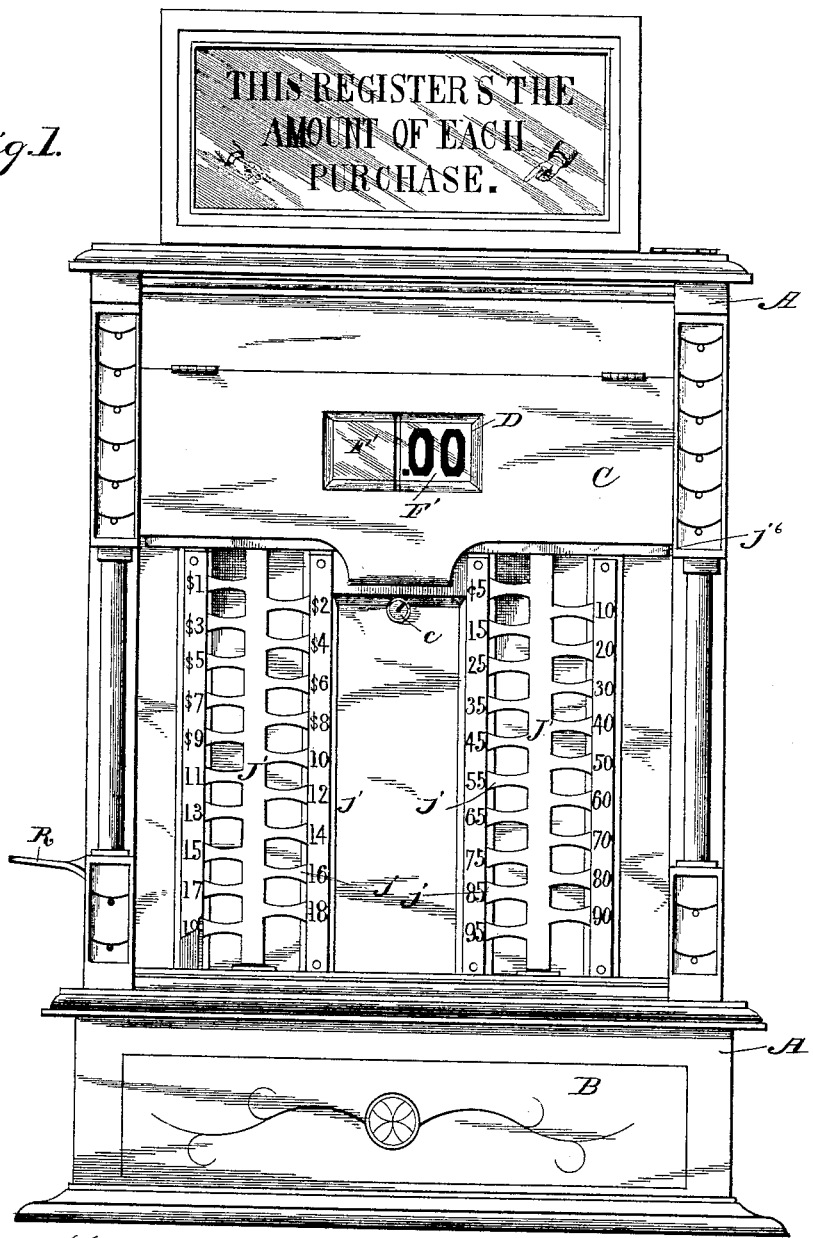
Figure 2:
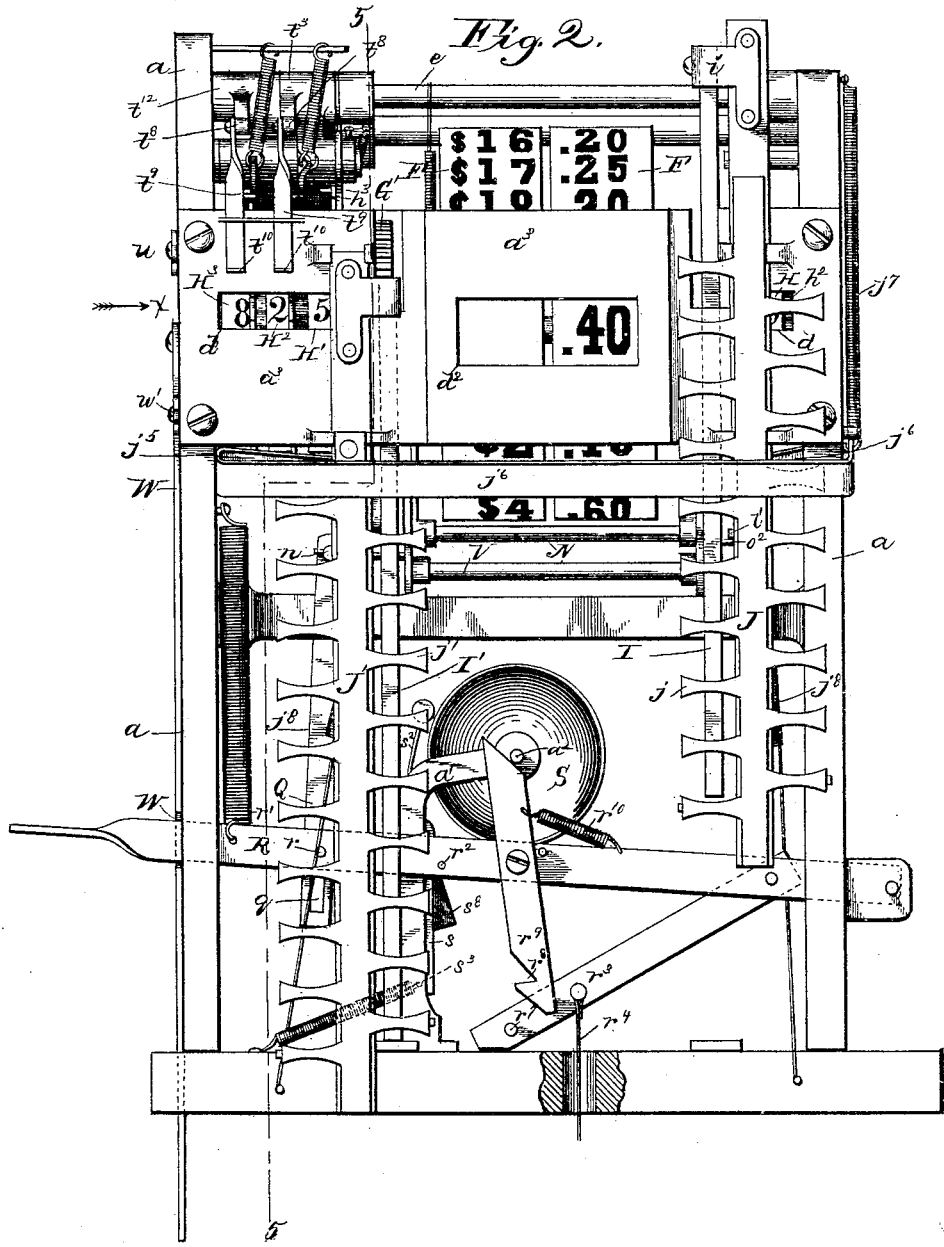
Figure 3:
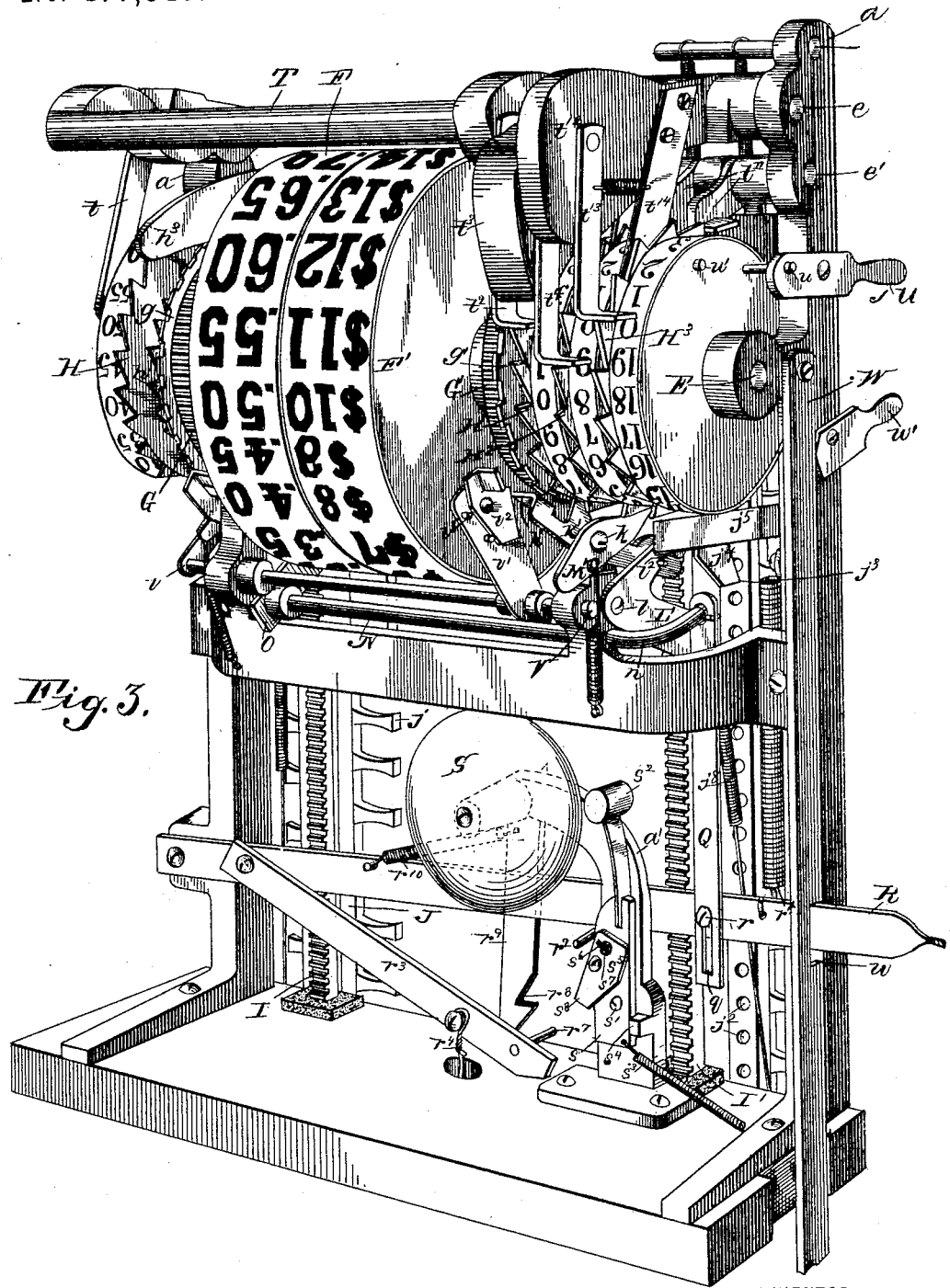
Figure 8:
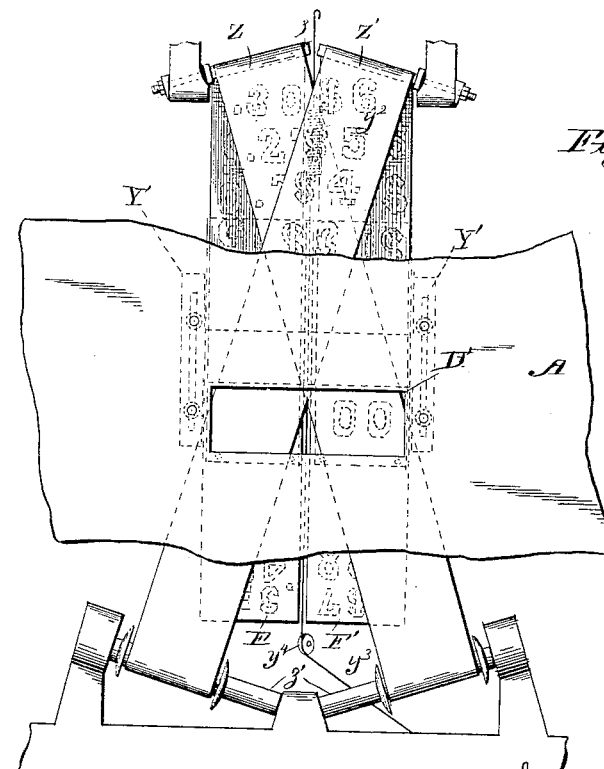
Figure 9:
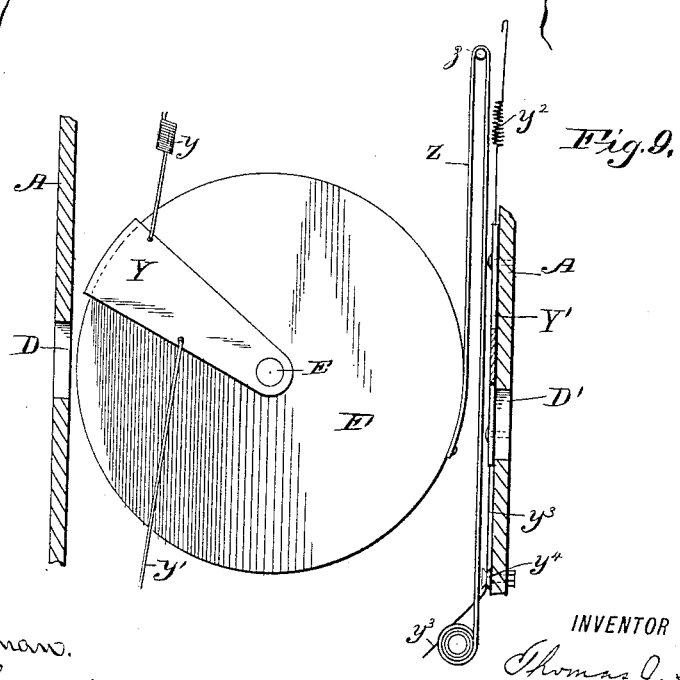

Of the accompanying drawings, forming a part of this specification, Figure 1 represents a front elevation of the machine in its casing. Fig. 2 represents a front elevation of the operative parts above the drawer, with the casing removed and with the cents-bar elevated to indicate a forty-cent purchase. Fig. 3 represents a perspective view of the operative parts above the drawer, taken from the left and rear. Fig. 4 represents a detail end view of the main shaft and the three-dollar-registering wheels thereon, the nearest and second of said wheels being partly broken away to illustrate the cams and pins for operating the arms of the weighted pawl-levers, which are also shown in said figure. Fig. 5 represents a vertical section on line 5 5 of Fig. 2, looking in the direction of the arrow $x$. Fig. 5$^a$ represents a perspective view of the drums and shield. Fig. 5$^b$ is a group of perspective views of some details, as hereinafter specifically described. Fig. 5$^c$ is a detail side elevation of a pawl-and-ratchet mechanism hereinafter described, the disk $g'$ being partially broken out to show pawl $g^2$. Fig. 6 represents a detail end elevation of the upper part of the mechanism on the cents side of the machine. Fig. 7 represents a detail vertical section of the drawer, showing the latch-bar W in side elevation. Fig. 8 is a detail rear view of a portion of the casing and showing the means for indicating at the rear as well as the front of the casing. Fig. 9 is a side elevation of the same and showing both front and rear shields.

The same letters of reference represent the same parts in all of the figures; but it is to be noted that when a distinction is hereinafter made between capital letters by the addition to one of them of a "prime-mark" the letter having the prime-mark denotes the duplicate part on the dollar side of the machine as the same letter without the mark denotes on the cents side—as, for instance, the letter J denotes the finger-bar for the cents indicator and register, and J' denotes the finger-bar for the dollar mechanism.

In the drawings, A represents a suitable casing containing a cash-drawer B, ejected by a spring $b$, and having as a part of the front of the casing a hinged flap C, with a lock $c$, affording access to so much of the interior as is necessary in ordinary use, and having a reading-opening D in such flap.

The construction and operation of the spring and connections for ejecting the drawer may be substantially the same as shown and described in my previous application filed June 15, 1891, Serial No. 396,144, and hence need not be more fully referred to herein, as no claims are herein made thereto.

Journaled on shaft E, which is suitably supported in a frame $a$ and extends across the apparatus near the top, are drums F F', bearing upon their peripheral faces numerals equally spaced and hereinafter referred to as the "cent-drum" and "dollar-drum," respectively. On the drum F the numerals represent cents and run in multiples of five from "5" to "95," inclusive, preceded by "00," and on the drum F' the numerals represent dollars and run from "1" to "19," inclusive, with a blank space immediately preceding figure "1" equal in amount to the space allotted to each of such figures "1" to "19," inclusive. At normal or the "zero point" the "00" on the cent-drum and the blank space on the dollar-drum show through the reading-opening D.

Journaled on the same shaft with the drums F F' and connected with them, respectively, by sleeves or other suitable connections or made integral with them are gear-wheels G G', respectively, having notched disks $g$ $g'$ integral therewith or attached thereto, each of said disks $g$ $g'$ having twenty notches. Since these notched disks are arranged to rotate with the gear-wheels G G', the sides of the notches practically form shoulders carried by the gears, which shoulders are engaged by other parts of the mechanism, as hereinafter described. On the gear-wheels are spring-pawls $g^2$ $g^2$, arranged to engage in forward movement and to ride over freely in backward movement ratchets $h$ $h'$, having twenty teeth each and smaller than but moving with the ratchet-wheels H H,' respectively, each of which also has twenty teeth and is loosely journaled on the shaft E. (See Figs. 5 and $5^c$, the latter being a detail view looking in the opposite direction from disk $g'$ in Fig. 5.)

The object of providing the ratchet-wheels H H' with the supplementary smaller ratchet-wheels $h$ $h'$, which latter are engaged by the pawls $g^2$, instead of having the said pawls engage the teeth of the larger ratchets, is to enable the said pawls to operate properly without interference with other operative parts engaging the teeth of said larger ratchet. The wheel H carries a backing-piece, on the peripheral surface of which are numerals corresponding with the ratchet-teeth in multiples of five from "5" to "95," inclusive, with the sign "00" intervening, representing cents. The wheel H' carries a similar backing-piece, on the opposite side, however, on the peripheral surface of which are two sets of succeeding numerals corresponding with the ratchet-teeth, each set running from "0" to "9," inclusive, representing units of dollars.

Intermeshing with the gear-wheels G G' are vertically-moving rack-bars I I', (see Figs. 2, 3, 5, and 6,) respectively, connected at their upper ends with finger-bars J J', respectively, moving vertically in suitable guides outside of the front of the casing from below up into the casing under the flap C when the finger-bars are raised and each having nineteen fingers or handles $j$ $j'$, respectively, alternately projecting from opposite sides and arranged at such distances apart, alternately on opposite sides, that the movement of the finger-bars the distance between any two such alternating fingers will move the gear-wheels G G', and with them the drums F F' and the wheels H H', one-twentieth of their circumferential distance, so as to properly display through the indication-reading opening D and the register-openings $d$ $d'$ (hereinafter described) the figures on such drums and wheels. The object of the finger-bars is through the connection described to rotate the drum and wheel suitable distances and at suitable times forward by applied energy and backward by the gravity of the finger-bars, as hereinafter described. On the case opposite each finger or handle $j$ $j'$ is indicated the value of that finger, and the numbers for the fingers on the bar J run downwardly in multiples of five from "5" to "95," inclusive, and on the bar J' from "1" to "19," inclusive. The proportion of the parts is such that the lifting of either finger-bar the distance from one finger to the next on the opposite side will bring the next indicating-numeral on its corresponding drum into view.

The finger and rack bars are longitudinally movable and connected together only at their upper ends, as shown in Figs. 2, 5, and 6, as by means of an angle-bracket $i$, and the finger-bars are located outside the front wall of the casing, while the rack-bars are located adjacent to the inner side thereof. By this means slots through the casing are unnecessary and there are practically no opportunities for the entrance, accidentally or intentionally, of substances likely to interfere with the proper working of the internal mechanism.

On the rear of each of the finger-bars J J' is a vertical row of interspaced recesses $j^2$, adapted to be engaged by the stop-tooth $j^3$ of the spring-actuated stop-latch $j^4$, there being a latch for each of said finger-bars.

A finger-lever $j^6$, consisting of a yoke-shaped lever, is pivoted to the sides of the frame, with its long horizontal portion extending across the front of the machine and in front of the finger-bars just above the upper figures marked upon the casing. The ends $j^5$ $j^5$ of this lever are bent in behind the frame and engage under the rear portion of the stop-latches $j^4$ $j^4$. A spring $j^7$ is connected with the lever $j^6$ at one end behind its pivot at that end, and said spring is of a strength in excess of the combined strength of the two springs for the two latches. Therefore when the lever $j^6$ is in its normal position the tension of its spring $j^7$, overcoming that of the spring of the latches, holds each of the latches with its tooth $j^3$ out of engagement with the back of its adjacent finger-bar; but if the front horizontal portion of the lever-frame $j^6$ be lifted positively, then the teeth of the stop-latches will be carried forward by the springs $j^8$ of the latches against the back of the finger-bars and adapted to enter any one of the series of recesses $j^2$ as it comes opposite the tooth for the respective bar. The location of these recesses is so proportioned that when the finger of the operator elevates a bar and its rack and engages and elevates the front bar of the lever $j^6$ the tooth of a latch will enter the next recess $j^2$ approaching it and momentarily arrest the motion of the finger-bar and rack, and thus prevent excessive motion of the parts due to inertia. To prevent the front bar of the yoke-shaped lever $j^6$ from binding on the face of the finger-bars J J', a stop projects from the frame of the machine over the said lever in rear of its pivot, as shown at $j^9$ in Fig. 6.

The stop-pawl plates K K' are pivoted on the uprights of the frame $a$ of the apparatus by screws $k$ (see Figs. 3 and 6) and have bent portions, forming flanges $k'$, Figs. 3, 5, and $5^b$, to engage at times, under the tension of suitable springs, with the teeth of the notched disks $g$ $g'$ against their forward rotation. The pawl-plates K K' have upward extensions $k^2$ $k^2$, each of which is adapted to be engaged by a pin $g^3$, Figs. 5 and 6, which projects from a notched disk $g$ or $g'$ toward the nearest side of the casing just before and at the zero-point in backward rotation of said disks. The extensions $k^2$ of the plates K K' carry pins $k^4$, Figs. 5 and $5^b$, adapted to be engaged at times with the recesses $l^2$ of the latch-plates L L'. Pivoted on the frame $a$ by the screws $l$ are gravity-latches L L', from which project on the sides opposite the nearest sides of the casing pins $l'$, Figs. 5, $5^b$, and 6. The latches L L' have locking-recesses $l^2$. Pivoted on the same screws $k$ $k$ with the plates K K' are pawl-plates M M', with bent portions forming flanges $m$, adapted to engage at times, under the tension of suitable springs, the teeth of the notched disks $g$ $g'$ against backward motion. On the plates M M' are pins $m'$, adapted to be engaged at times by the recesses $p^2$ of the latch-plates P P', hereinafter described. Suitably supported in the frame $a$ is a rocking shaft N, Figs. 3 and 6, having a bent portion $n$ at one end and having fixedly secured to it arms O O', to which are pivoted by screws $o$ latch-levers P P', subject to the tension of springs $p$ and stopped by pins $p'$, which are carried by arms O O', said levers having locking-recesses $p^2$ to engage at times pins $m'$. (See Figs. 5 and 6.) From the gear-wheels G G' on the sides opposite the nearest sides of the casing project pins $g^4$, which engage the upper portion of the latch-levers P P' just before and at the zero-point of backward rotation of the gear-wheels G G'. Projecting from the sides of the arms O O' opposite the nearest side of the casing are pins $o^2$, Figs. 5 and $5^b$, adapted to engage the pins $l'$ when the arms O O' are elevated, as hereinafter described. The said arms O O' are rigidly secured to the rocking shaft N. The shaft N (see Fig. 3) is rocked and the arms O O' elevated and depressed through the action of a controlling-lever R, connected with the bent end $n$ of the rocking shaft N by a link Q, having a slot $q$, in which plays a pin $r$ on the lever R, the slot $q$ permitting the lever R to have a certain amount of lost motion relative to the link Q. The lever R projects through the casing, so as to be operated by the hand from the outside, and is normally held elevated by the action of a spring $r'$. The lever R is depressed by the hand of the operator in the act of effacing one indication and setting the apparatus to prepare it for making another indication and registration by elevating the finger-bars J J', the lever R when released being raised again by its spring $r'$ after the indication and registration is completed.

Supported on another standard $a'$ in the casing is a bell S, and on the same standard in suitable position is a plate $s$, pivoted on a screw $s'$, and from which extends upwardly a bell-striker $s^2$. The spring $s^3$, connected to the base of the machine and to the lower end of the plate $s$, has a tendency to move the plate $s$, so as to throw the striker $s^2$ against the bell S, the action of the spring being limited by the stop $s^4$ on the standard $a'$. Pivoted on the plate $s$ is a gravity trip-plate $s^5$, the action of which is limited by the pin $s^6$ on the plate $s$, playing through a hole $s^7$ in the trip-plate $s^5$. A projecting part $s^8$ on the trip $s^5$ is in the path of the movement of a pin $r^2$ on the lever R, so disposed that on the depression of the lever R the pin $r^2$ passes freely down under the projection $s^8$ of the gravity trip-plate, and when the lever R rises the pin $r^2$ engages under the projection $s^8$, tilting the plate $s$ against the action of the spring $s^3$ until the pin $r^2$ has passed along and beyond the bevel of the projecting portion, as shown, when the action of the spring $s^3$ restores the plate $s$ to normal position, thereby causing the bell-striker to sound the bell.

On the lever R is a pivoted gravity-lever $r^3$, connected by link $r^4$ to the latch-bar $r^6$, pivoted to the front of the casing just over the drawer, the other end of said bar engaging the rear side of the spring-pressed drawer B to hold it locked against the action of the ejecting-spring when the free end of the lever $r^3$ is left depressed. On the lever $r^3$ is a pin $r^7$, adapted to be engaged by the latch-recess $r^8$ of the latch-lever $r^9$, pivoted on the lever R and subject to the action of spring $r^{10}$. The upper end of the latch-lever $r^9$ is beveled to engage a pin $a^2$ on the bell-supporting standard $a'$. When the lever R is depressed, as the bevel on the lever $r^9$ rides along the pin $a^2$ the spring $r^{10}$ is free to draw the recess $r^8$ into engagement with the pin $r^7$, and as the lever R rises again raises the lever $r^3$, and with it the drawer latch-bar $r^6$, until the bevel, riding along the pin $a^2$, has moved the latch-recess out of engagement with the pin $r^7$, allowing the lever $r^3$, and with it the drawer latch-bar $r^6$, to fall. When the drawer latch-bar is raised, the drawer is ejected by its spring $b$, and the drawer latch-bar when released falls into a position to lock the drawer when closed by the hand of the operator.

On the ratchet-wheel H is a cam $h^2$, (see Fig. 6,) over which rides a dependent arm $t$, secured to the adjacent end of the weighted rocking frame T, hung on the shaft $e$, which is supported in the frame $a$, so that on each revolution of the wheel H the arm $t$, riding over the cam $h^2$, rises, and thereby raises the free side of the frame T. On the opposite end of the frame T is pivoted a pawl $t^2$, having a spring connected thereto to cause it to engage with the teeth of the ratchet H'. The frame T rises sufficiently under the action of the cam $h^2$ to raise the pawl $t^2$ into engagement with the next succeeding tooth of the ratchet H'. (See Fig. 3.) When the arm $t$ has passed over the tip of the cam the weighted frame T falls by gravity and the pawl $t^2$ carries the ratchet-wheel H' around one tooth, thereby transferring the value of a complete revolution of the wheel H—to wit, one dollar—to the ratchet H', each tooth of which represents one dollar.

Pivoted on the shaft $e$ is a weighted lever $t^3$, carrying a spring-held pawl $t^4$, engaging the teeth of a twenty-toothed ratchet-wheel $H^2$, journaled on the shaft E, with a backing-piece carrying peripheral digit-signs arranged as on wheel H', said digits representing the tens of dollars. The lever $t^3$ carries a rigid depending arm $t^6$, (see Fig. 4,) adapted to be engaged by two diametrically-opposite pins $t^7$, extending from the backing of the wheel H' toward the ratchet $H^2$, so that the action of each pin $t^7$ on the depending arm $t^6$ on each half-revolution of the wheel H' causes the weighted lever $t^3$ to rise sufficiently to bring the pawl $t^4$ into engagement with the next succeeding tooth of the ratchet-wheel $H^2$, so that after the pin $t^7$ has passed out of engagement with the depending arm $t^6$ the weighted lever drops, carrying the ratchet-wheel $h^2$ forward one tooth and transferring the value of a half-revolution of the wheel H'—to wit, ten dollars—to the wheel $H^2$, each tooth of which represents ten dollars. Journaled on the shaft E is another ratchet-wheel $H^3$, also having twenty teeth and a backing carrying peripheral numerals from "0" to "19," inclusive, representing hundreds of dollars. A weighted lever $t^{12}$ is mounted on the shaft E in similar manner to the frame T and lever $t^3$ and carries a spring-held pawl $t^{13}$ and a rigid arm $t^{14}$, depending from it. The pawl $t^{13}$ engages the teeth of ratchet-wheel $H^3$, and the arm $t^{14}$ is adapted to be engaged by either one of two pins or two cams on the side of the backing-piece of wheel $H^2$. Since each half-revolution of wheel $H^2$ registers "$100," said amount is transferred to wheel $H^3$ as each tooth thereof is operated by pawl $t^{13}$. The lever $t^{12}$ is shown clearly in the perspective view, Fig. 3, and the shape of the lever $t^3$ and connected parts are similar thereto.

On the side of one upright of the frame $a$ is a pivoted lever U, (see Fig. 3,) having a pin $u$, which through the movement of the lever can be moved into the path of the pin $u'$ on the backing of the wheel $H^3$, which pin $u'$ is so located that it engages with the pin $u$ and stops the wheel $H^3$ at a point to display through the reading-opening $d'$ the figures "19," the highest value of the wheel $H^3$, so that when its highest registry is reached the wheel $H^3$ can be rotated no farther until the pin $u$ is moved out of engagement with the pin $u'$ by the action of the lever U, which can be reached from the front of the machine by any one having a key to the lock $c$ to unlock and raise the hinged flap C. The lever U is adapted to be held in the position into which it is moved by any suitable holding device—as, for instance, frictional engagement between the lever U and the standard.

The object of the cam $h^2$ being used on the wheel H to operate the arm $t$ of the rocking weighted frame T is to render uniform the power required to rotate the wheel H. If a pin were used in place of the cam, more power would be required when said pin would be moving in contact with the arm $t$ than when moving out of such contact. The object of having pins instead of cams on wheel H' to operate the arm $t^6$ of lever $t^3$ is because since the rotation of said wheel H' may at times be rapid (as, for instance, if "$19" were to be registered at one lifting of the finger-bar J') such rapid motion might cause the wheel H' to be moved to such an extent before the point of arm $t^6$ dropped over the tip of a cam that said point of the arm would drop onto a part of the cam not its lowest point. A pin avoids this difficulty.

As before stated, the means on wheel $H^2$ for lifting the weighted lever $t^{12}$ may be two cams or two pins, as preferred. The wheel $H^2$ at no time has a rapid motion, and in order to render the necessary operating power uniform I prefer to employ two cams for the same reason that I use a cam on wheel H.

Since the value of each completed revolution of the wheel H is transferred to the wheel H', if wheels H and H' were simultaneously rotated forward by the finger-bars and connecting mechanism at a time when the wheel H was in a position to transfer the value of a completed revolution to the wheel H' it might happen that the transferred value would be lost in the forward rotation of the wheel H' as induced direct from the finger-bar, and thus a false total registered.

To prevent the simultaneous operation of the wheels H and H', I provide the following arrangement: Journaled on the frame is a rocking shaft V, carrying at one end an arm $v$, Figs. 3 and 6, adapted to be depressed as each successive tooth of the ratchet H rides over it, thereby lifting another arm $v'$, Figs. 3 and 5, on the other end of the rocking shaft V, so as to throw a gravity-pawl $v^2$ on said arm $v'$ into successive engagement with the shoulders formed by the sides of the notches in disk $g'$, thus locking the disk $g'$ and preventing any transmission of motion through it and the gear G' to the wheel H' while the ratchet-wheel H is in forward motion. Suitable stop-pins, as $v^3$, may be located on the pawl $v^2$ to limit the tilting motion of said pawl. On the ratchets H H' are the escapements $h^3$, Fig. 6, which serve to prevent motion of the ratchets with such speed as to throw them by impetus beyond the point to which they may be moved by positive motion, and which also act as stops against the backward rotation of the ratchets H H'. Pivoted on a short supplementary shaft $e'$ are spring-operated stop-pawls $t^{11}$, Fig. 3, to prevent backward rotation of the ratchets $H^2 H^3$. From the weighted levers $t^3$ and $t^{12}$ are forwardly-extending arms $t^8$, from which depend pivoted hangers $t^9$, Fig. 2, the extended flanges $t^{10}$ of which are in reach of the hand from the front when the hinged flap C is raised by a person having the key to its lock, and by the depression of the hangers the weighted levers $t^3$ $t^{12}$ are elevated and released to rotate the ratchets $H^2$ $H^3$ in resetting the machine, as hereinafter described. Connecting the sides of the supporting-frame is a plate $a^3$, with an opening $d^2$, through which the indications on the drums may be read through the opening D in the casing. Other openings $d$ $d'$ are formed in said plate, through which may be read, when the hinged flap is raised, the amounts registered on the peripheral surfaces of the backings on the wheels H H' $H^2$ $H^3$, showing the total amount registered.

The central portion of the front plate $a^3$ is projected forward beyond the end portions, in order that the reading-openings for the indicator-drums and registering-wheels may be located close to said drums and wheels.

It is desirable to insure the operator's closing the drawer after each indication, (except during unusually brisk business,) so as to lock the drawer against being opened surreptitiously without ringing the bell. As the depression of the lever R is necessary to each operation, this purpose is accomplished by locking the lever R against depression when the drawer is open. This is done through a depending latch-bar W, pivoted on the left upright of the frame (see Fig. 3) at such a point that its tendency through gravity is to swing forward and bring a locking-recess $w$ into engagement with the lever R. When the drawer is fully closed, a projection on the drawer engages the lower end of the lever W and moves it back, carrying its recess out of engagement with the lever R. When the drawer opens under the stress of its spring, the lever W is allowed to swing forward, bringing its recess into engagement with and locking the lever R against depression until the drawer is again fully closed. A cam-lever $w'$ is so pivoted to the frame with reference to the lever W that the person having the key to unlock and raise the flap C can, if desired, depress an extending end of the lever $w'$, and thereby cause its cam-surface to push the lever W and its recess $w$ back out of engagement with the lever R, where it will remain whether the drawer is closed or not until the cam end of the lever $w'$ shall be again depressed out of engagement with the lever W.

With the parts of the machine in their normal positions before operation the indicating-drums F F' and the registering-ratchets H H' $H^2$ $H^3$ are at the zero-point, the finger-bars J J' in their depressed or rest positions, and the lever R held elevated by its spring, and the pawls K K' held out of engagement with the notches in the disks $g$ $g'$ by the action of the pins $g^3$ on the upwardly-extending arms $k^2$ of the pawls K K', and the latches L L' are held by the action of the pins $o^2$ on the pins $l'$ raised above the pins $k^4$, and the latch-recesses $p^2$ are drawn from engagement with the pins $m'$ by the action of the pins $g^4$ on the levers P P', and the pawls M M' are in engagement with the notched disks $g$ $g'$.

In Fig. $5^a$ is shown a $\cup$-shaped shield Y, fitting over the drums and having its ends mounted freely on the shaft E. A spring $y$ connects the shield with a stationary part, as shaft $e$, and keeps the shield normally in an elevated position, and a wire or cord $y'$ connects the shield with the controlling-lever. The spring $y$ and connection $y'$ appear in Fig. 2, but the shield is concealed behind the plate $a^3$ above the reading-opening.

As will be readily understood, when the controlling-lever is depressed the shield moves down across and behind the reading-opening, and until the controlling-lever is released no indication can be read.

In the operation of the machine the lever R is depressed, allowing the latches L L' to drop into engagement with the pins $k^4$ to lock the pawls K K' out of engagement with the notched disks $g$ $g'$ when the pins $g^3$ have been moved forward away from the upward extensions $k^2$ of the pawls K K'. The gears G G', moving the drums F F' and the wheels H H', are now free to move forward under the action of the finger-bars, the notches of the disks $g$ $g'$ moving freely over the pawls M M'. The finger of the operator having met and raised the outwardly-extending horizontal bar of the finger-lever $j^6$, and thereby depressed the rearwardly-extending portions $j^5$ against their spring $j^7$ away from engagement with the stop-latches $j^4$, the said latches under the influence of their springs move the stop-teeth $j^3$ into engagement with the recesses $j^2$ on the rear of the finger-bar, stopping each finger-bar, respectively, at the point where it has imparted to the gear-wheels G G', through the rack-bars I I', sufficient motion to operate the indicating-drums and registering ratchet-wheels to indicate and register the value of the finger brought up under the lever $j^6$. Motion of the parts being stopped and the finger-bars released the stop-teeth $j^3$ move out of engagement with the recesses $j^2$; but the gears G G' cannot rotate backward again because of the engagement of the pawls M M' with the disks $g$ $g'$. The lever R is then released and rises under the tension of its spring, thus rocking the shaft N, and with it the arms O O', carrying the pins $o^2$, thereby raising the latches L L' out of engagement with the pins $k^4$ of the pawls K K', which under the influence of their springs fall into engagement with the teeth of the disks $g$ $g'$, which, with their connecting mechanism, are now locked against movement in either direction, leaving the finger-bars elevated and the indication exhibited through the opening D until the lever R is depressed preparatory to another indication and registration. When the arms O O' rise with the lever R, the latch-recesses $p^2$ on the levers P P', which are no longer held out of engagement by the pins $g^4$, fall into engagement with the pins $m'$. The raising of the lever R after the indication and registration rings the bell and releases the spring-pressed money-drawer, as heretofore described. When the lever R is depressed preparatory to another indication and registration, its depression carries down the arms O O', carrying the levers P P', bringing the pawls M M', now latched to the levers P P', down out of engagement with the teeth of the disks $g$ $g'$, at the same time withdrawing the pins $o^2$ from under the pins $l'$ on the latches L L'. The disks $g$ $g'$, being released from the engagement of the pawls M M', are rotated back to the zero-point by the weight of the rack-bars and finger-bars until the pins $g^3$ and $g^4$, returning to the zero-point, would engage the extensions $k^2$ of the pawls K K' and the upper ends of the latch-levers P P', drawing the pawls K K' out of engagement with the disks $g$ $g'$ and releasing the pawls M M' from depressed engagement with the latch-levers P P' to engage the disks $g$ $g'$ and allowing the latches L L' to lock over the pins $k^4$, when the parts would be in position to again raise the finger-bars for another indication, as before. To reset the registering mechanism at the zero-point after any number of successive registrations up to the limit have been totalized, the ratchet H, through its finger-bar I and intermediate connections described, is moved forward sufficiently to expose "00" through the reading-opening $d$. Then in the same manner the ratchet H' is moved forward to expose "0" through its reading-opening $d'$. The ratchets $H^2$ $H^3$ then in order are moved forward to the zero-point through the operation of the dependent hangers $t^9$, the pin $u$ having been temporarily moved out of the path of the pin $u'$ to allow it to pass till the wheel $H^3$ is moved to the zero-point.

In order to enable the amount of a purchase to be indicated at the back and front of the machine simultaneously, so that the location of the machine for use will not be restricted, I may utilize the construction now to be described.

Referring to Figs. 8 and 9, in which all the parts of the machine, except the drums F F' and the front shield $y$, are omitted, Z Z' are ribbons attached at one end to the drums at a peripheral point preferably diametrically opposite the front reading-opening when the drums are at zero. These ribbons pass over guide-rollers $z$, suitably supported in a part of the frame and inclined, as shown, and then cross each other and are wound on spring-rollers $z'$, which may be of a construction similar to the ordinary spring curtain-rollers to allow the ribbons to be wound on the drums when the latter are operated by the finger-bars and to take up the slack of the said ribbons when the drums are returning to the zero-point. With this construction the figures on the cents and dollar drums will extend, respectively, only to and including ".45" and "$9," the balance up to ".95" and "$19" being on the face of the ribbons which would be outward on said drums when wound thereon.

At the back of the casing is a reading-opening D', through which the ribbons show just below their crossed point, and beginning at this point, when the drums are at the zero-point, the ribbons are provided with a series of figures corresponding to those on the drums and upper ends of the ribbons, the said figures increasing in amounts indicated toward the lower end of the ribbons.

The object of crossing the ribbons is to enable the dollar and cent numerals to be read in the same order from the rear as from the front. Inside the casing and fitted to slide vertically in suitable guides is a shield Y', having a spring connection, as at $y^2$, to keep it normally elevated, so as to expose the ribbons through said opening. A cord or wire connection, as at $y^3$, leads from the lower edge of the shield Y' around a guide-pulley $y^4$ to the controlling-lever R. The operation of this shield is similar to that of the shield Y for the front reading-opening and need not be further described.

Having now described my invention, what I claim, and desire to secure by Letters Patent, is—

1. In a cash register and indicator, the combination, with a casing having the lower portion of its front wall entirely closed and having an overhanging or projecting upper portion, of suitable registering mechanism within said casing, a rigid longitudinally-movable finger-bar adapted to rest in front of said lower portion of the front wall or to be moved into the projecting upper portion, and a connection solely from the upper end of said finger-bar to the internal registering mechanism, whereby access of dust or other foreign matter to the interior of the casing may be avoided.

2. In a cash indicator and register, the combination, with a frame having a front plate provided with a plurality of reading-openings, of a main shaft carrying indicator-drums and registering-wheels behind said openings and a casing having a single reading-opening registering with one of the openings in the said front plate, substantially as described.

3. In a cash indicator and register, the combination, with a casing having the lower portion of its front wall entirely closed and a straight vertically-movable finger-bar outside the casing, of a rack-bar parallel thereto and inside the casing and connected to the finger-bar only at one end, a gear-wheel meshing with the teeth of the rack-bar, an indicator-drum directly connected with the gear to rotate therewith, and registering-wheels indirectly connected with said gear, substantially as described.

4. In a cash indicator and register, the combination, with the casing thereof having guides, of a finger-bar vertically movable in said guides, an indicator-drum, a direct rack-and-gear connection between said finger-bar and drum for imparting a rotary reciprocating motion to the drum, and registering mechanism operated by the said rack-and-gear connection, substantially as described.

5. The combination, with the casing of a cash indicator and register, of a finger-bar vertically movable in guides, a rack-bar connected at one end to said finger-bar, an indicating-drum having a gear meshing with said rack-bar, two registering-wheels, one of which is provided with ratchet-teeth and the other with means for receiving motion from the rack-bar, a weighted arm pivoted at one end and carrying a pawl engaging said teeth, and means carried by the other registering-wheel to elevate said arm, substantially as described.

6. The combination, with the casing of a cash indicator and register, of a finger-bar vertically movable in guides, a rack-bar connected at one end to said finger-bar, an indicating-drum having a gear meshing with said rackbar, two registering-wheels, one of which is provided with ratchet-teeth and the other with means for receiving motion from the rack-bar, a weighted arm pivoted at one end and carrying a pawl engaging said teeth, a cam secured to rotate with the other registering-wheel, and a rigid projecting arm carried by the weighted arm and resting on said cam, substantially as described.

7. In a cash indicator and register, the combination, with an indicating-drum, of two registering mechanisms supported by the drum-shaft, one each side of the drum, a weighted frame extending past the drum and carrying a pawl at one end to operate one registering mechanism, and means operated by the other registering mechanism to lift said weighted frame, substantially as described.

8. The combination, with a rigid and vertically-reciprocating finger-bar and indicating and registering mechanisms operated thereby, of a spring-held controlling-lever having connections for locking and releasing the said finger-bar relative to motion thereof in either direction.

9. The combination, with a rigid and vertically-reciprocating finger-bar and indicating and registering mechanisms operated thereby, of a money-receptacle and a spring-held controlling-lever having connections for locking and releasing the said finger-bar relative to motion thereof in either direction and permitting the opening of the money-receptacle.

10. The combination, with a rigid and vertically-reciprocating finger-bar and indicating and registering mechanisms operated thereby, of a money-receptacle and alarm and a spring-held controlling-lever having connections for locking and releasing the said finger-bar relative to motion thereof in either direction, operating the alarm and permitting the opening of the money-receptacle.

11. In a cash indicator and register, the combination, with a spring-opened money-receptacle, of a lock for holding the receptacle closed, a controlling-lever projecting outside the casing, a spring-held latch-lever pivoted to the controlling-lever and having one end beveled and a recess at its other end, a fixed surface for the beveled end of the latch-lever to ride against, a movable pin adapted to be engaged by the said recess, and a connection from the said pin to the lock of the money-receptacle, substantially as described.

12. In a cash indicator and register, the combination, with a vertically-movable finger-bar having a series of recesses, of a spring-actuated latch adapted to enter any one of said recesses, a movable bar located in the path of movement of the hand of the operator, connections from said bar to the latch, and a spring to cause the said connections to normally hold the latch out of engagement with said recesses, whereby upon lifting said bar the latch will be permitted to enter a recess and momentarily arrest further elevation of the finger-bar.

13. The combination, with two sets of indicating and registering mechanisms, of a peripherally-shouldered disk or wheel connected with one of said sets, a stop-pawl or detent to engage the shoulders of said disk or wheel, and means operated by the other set of said mechanisms for vibrating said stop-pawl or detent, substantially as described.

14. The combination, with a pair of gear-wheels for operating two sets of indicating and registering mechanisms, of a ratchet secured to rotate with one gear and a series of shoulders secured to rotate with the other gear, and a rock-shaft having an arm at one end engaging said ratchet and a stop-pawl at the other end to engage said shoulders, substantially as described.

15. The combination, with a pair of gear-wheels for operating two sets of indicating and registering mechanisms, of a ratchet secured to rotate with one gear and a series of shoulders secured to rotate with the other gear, and a rock-shaft having an arm at one end engaging said ratchet and an arm at the other end carrying a loosely-pivoted gravity-pawl to engage said shoulders, substantially as described.

16. In a registering mechanism consisting of a plurality of wheels with suitable transfer devices, the combination, with the highest registering-wheel of the series, of a pin projecting laterally therefrom and a stop-pin movable into and out of the path of movement of the said wheel-pin, substantially as and for the purpose set forth.

17. In a cash indicator and register, the combination, with a straight vertically-reciprocating finger-bar adapted to operate the parts of the machine to indicate and register any one of a series of different amounts, of mechanism for preventing a second movement of said bar in an operating direction after it has commenced a return movement until said return movement is completed.

18. In a cash indicator and register, the combination, with a straight vertically-reciprocating finger-bar adapted to operate the parts of the machine to indicate and register any one of a series of different amounts, of an alarm and mechanism for preventing a second movement of said bar in an operating direction after it has commenced a return movement until the alarm is operated and the said return movement is completed.

19. In a cash indicator and register, the combination, with a straight vertically-reciprocating finger-bar adapted to operate the parts of the machine to indicate and register any one of a series of different amounts, of mechanism for preventing a single indication resulting from successive operations in the same direction.

20. In a cash indicator and register, the combination, with a straight vertically-reciprocating finger-bar adapted to operate the parts of the machine to indicate and register any one of a series of different amounts, of a controlling device and mechanisms connected therewith to prevent successive operations of the indicator and register in the same direction during a single complete operation of the controlling device.

21. In a cash indicator and register, the combination, with a controlling device having connections for normally holding the indicating mechanism against operation, of a shield normally exposing the indicator and connections between said shield and controlling device, whereby movement of said controlling device in one direction conceals the indicator and releases the indicating mechanism.

22. In a cash indicator and register, the combination, with a controlling-lever having connections for normally holding the indicating and registering mechanism against operation, of an indicator-drum, a shield outside of the periphery of the drum, a spring for normally holding the shield to expose the drum, and connections from said shield to the lever, substantially as described.

23. In a cash indicator and register, the combination, with a pair of indicating-drums, of a casing having front and rear reading-openings and indicating-ribbons attached to and operated by said drums, the characters on the said drums and ribbons being visible through different reading-openings.

24. In a cash indicator and register, the combination, with the casing having front and rear reading-openings, of a pair of indicating-drums visible through one opening and a pair of indicating-ribbons attached at one end to said drums and crossing each other and visible through the other reading-opening beyond the point of crossing.

25. In a cash indicator and register, the combination, with the casing having front and rear reading-openings, of a pair of indicating-drums visible through one opening, a pair of guide-rollers and spring-rollers, and a pair of indicating-ribbons attached to the drums, passing over the guide-rollers, crossing each other, and connected with the spring-rollers and visible below their crossed point through the other opening, substantially as described.

26. In a cash indicator and register, the combination, with a pair of indicating-drums and a pair of crossed indicating-ribbons attached to and operated by said drums, of shields for both the drums and ribbons, substantially as described.

In testimony whereof I affix my signature in presence of two subscribing witnesses.

THOMAS J. HUME.

Witnesses:
  W. G. HUME,
  FRED MCCOY.